(12) United States Patent
Yu et al.

(10) Patent No.: US 9,629,168 B2
(45) Date of Patent: Apr. 18, 2017

(54) APPARATUS AND METHOD FOR TRANSMITTING/RECEIVING DATA IN COMMUNICATION SYSTEM

(71) Applicant: Electronics and Telecommunications Research Institute, Daejeon (KR)

(72) Inventors: Hee-Jung Yu, Daejeon (KR); Min-Ho Cheong, Daejeon (KR); Sok-Kyu Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/691,215

(22) Filed: Apr. 20, 2015

(65) Prior Publication Data

US 2015/0230256 A1 Aug. 13, 2015

Related U.S. Application Data

(62) Division of application No. 13/662,316, filed on Oct. 26, 2012, now Pat. No. 9,036,598.

(30) Foreign Application Priority Data

Oct. 26, 2011 (KR) .................. 10-2011-0110121
Oct. 25, 2012 (KR) .................. 10-2012-0118999

(51) Int. Cl.
*H04W 4/00* (2009.01)
*H04W 72/08* (2009.01)
(Continued)

(52) U.S. Cl.
CPC ....... *H04W 72/08* (2013.01); *H04W 72/0406* (2013.01); *H04W 72/0446* (2013.01); *H04W 74/02* (2013.01)

(58) Field of Classification Search
CPC ..... H04W 72/02; H04W 72/04; H04W 72/08; H04W 72/087; H04W 72/0406; H04W 72/0446
See application file for complete search history.

(56) References Cited

U.S. PATENT DOCUMENTS

2007/0280156 A1* 12/2007 Kwon ............... H04W 74/0816
370/328
2008/0279210 A1* 11/2008 Naka .................... H04W 28/18
370/448

(Continued)

FOREIGN PATENT DOCUMENTS

KR 10-2010-0083703 A 7/2010

*Primary Examiner* — Kan Yuen

(57) ABSTRACT

A data transmission apparatus in a communication system includes a reception unit configured to receive terminal information from a plurality of terminals through a new frequency band for transmission and reception of data between the plurality of terminals and an AP (access point); a determination unit configured to determine access timing of the terminals to the AP by using the terminal information, and generate terminal access information including information on the access timing; and a transmission unit configured to transmit the terminal access information and beacon frames to the terminals, wherein the terminals access the AP and transmit data frames to the AP, at the access timing based on the beacon frames.

14 Claims, 6 Drawing Sheets

(51) Int. Cl.
*H04W 74/02* (2009.01)
*H04W 72/04* (2009.01)

(56) References Cited

U.S. PATENT DOCUMENTS

| | | | |
|---|---|---|---|
| 2009/0201841 A1* | 8/2009 | Tachikawa | G01N 23/223 370/310 |
| 2010/0074190 A1* | 3/2010 | Cordeiro | H04W 48/16 370/329 |
| 2010/0177656 A1* | 7/2010 | Kim | H04W 76/025 370/252 |
| 2010/0177756 A1 | 7/2010 | Choi et al. | |

* cited by examiner

APPARATUS AND METHOD FOR TRANSMITTING/RECEIVING DATA IN COMMUNICATION SYSTEM

CROSS-REFERENCES TO RELATED APPLICATIONS

The present application is a divisional of U.S. patent application Ser. No. 13/662,316 filed on Oct. 26, 2012, which claims priorities of Korean Patent Application Nos. 10-2011-0110121 and 10-2012-0118999, filed on Oct. 26, 2011, and Oct. 25, 2012, respectively, which are incorporated herein by reference in their entireties.

BACKGROUND OF THE INVENTION

Field of the Invention

Exemplary embodiments of the present invention relate to a communication system, and, more particularly, to an apparatus and a method for transmitting and receiving data in a communication system, in which an AP (access point) transmits and receives data while controlling accesses of a plurality of terminals, that is, stations (STAs), to ensure a service quality of the terminals.

Description of Related Art

In a current communication system, research for providing various qualities of service (hereinafter, referred to as 'QoS') to users at a high transmission rate has been actively conducted. In a wireless local area network (hereinafter, referred to as 'WLAN') system as an example of such a communication system, research for methods for stably transmitting large data at a high speed through limited resources has been actively conducted. In particular, in a communication system, research for data transmission through wireless channels has been conducted. Recently, methods for the WLAN system to normally transmit and receive large data by effectively using limited wireless channels have been suggested.

Meanwhile, in a current communication system, in order to efficiently transmit larger data, research for a new frequency band which is not used by legacy devices for data transmission and reception in an existing communication system has been conducted. In particular, research for data transmission and reception in such a new frequency band has been conducted.

However, in the current communication system, no concrete method for transmitting and receiving data in a new frequency band which is not used by the legacy devices band has been suggested. In particular, no concrete method for a frame for transmitting and receiving data in a new frequency band and no concrete method for normally transmitting and receiving data to and from a plurality of users have been suggested. In other words, no concrete method for an AP to normally transmit and receive data to and from a plurality of users, for example, terminals, in a new frequency band while controlling accesses of the terminals to ensure a QoS has been suggested.

As a consequence, in order to stably transmit and receive data at a high speed through a new frequency band in a communication system, for example, a WLAN system, methods for configuring a frame in a new frequency band and normally transmitting and receiving data to and from a plurality of users, for example, a plurality of terminals, through the frame in the new frequency band while controlling accesses of the terminals to ensure a QoS are demanded in the art.

SUMMARY OF THE INVENTION

Embodiments of the present invention are directed to an apparatus and a method for transmitting and receiving data in a communication system.

Other embodiments of the present invention are directed to an apparatus and a method for configuring a frame in a new frequency band and stably transmitting and receiving data at a high speed in a communication system.

Other embodiments of the present invention are directed to an apparatus and a method for normally transmitting and receiving data through a frame supporting a multi-bandwidth in a new frequency band while controlling accesses of a plurality of terminals to ensure a service quality of the terminals, in a communication system.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a data transmission apparatus in a communication system includes: a reception unit configured to receive terminal information from a plurality of terminals through a new frequency band for transmission and reception of data between the plurality of terminals and an AP (access point); a determination unit configured to determine access timing of the terminals to the AP by using the terminal information, and generate terminal access information including information on the access timing; and a transmission unit configured to transmit the terminal access information and beacon frames to the terminals, wherein the terminals access the AP and transmit data frames to the AP, at the access timing based on the beacon frames.

In accordance with another embodiment of the present invention, a data reception apparatus in a communication system includes: a generation unit configured to generate terminal information in a new frequency band for transmission and reception of data between a plurality of terminals and an AP (access point); a transmission unit configured to transmit the terminal information to the AP; a reception unit configured to receive beacon frames through the new frequency band, and receive terminal access information corresponding to the terminal information; and a verification unit configured to verify access timing to the AP based on the beacon frames by using the terminal access information, wherein the transmission unit accesses the AP at the access timing and transmits data frames to the AP.

In accordance with another embodiment of the present invention, a data transmitting method in a communication system includes: transmitting beacon frames to a plurality of terminals through a new frequency band for transmission and reception of data between the plurality of terminals and an AP (access point); receiving terminal information from the terminals through the new frequency band; determining access timing of the terminals to the AP by using the terminal information, and generating terminal access information including information on the access timing; and transmitting the terminal access information to the terminals, wherein the terminals access the AP and transmit data frames to the AP, at the access timing based on the beacon frames.

In accordance with another embodiment of the present invention, a data receiving method in a communication system includes: receiving beacon frames from an AP (access point) through a new frequency band for transmission and reception of data between a plurality of terminals and the AP; generating terminal information in the new frequency band; transmitting the terminal information to the AP; receiving terminal access information corresponding to the terminal information; verifying access timing to the AP based on the beacon frames by using the terminal access information; and accessing the AP at the access timing and transmitting data frames to the AP.

DESCRIPTION OF SPECIFIC EMBODIMENTS

Figure 1:
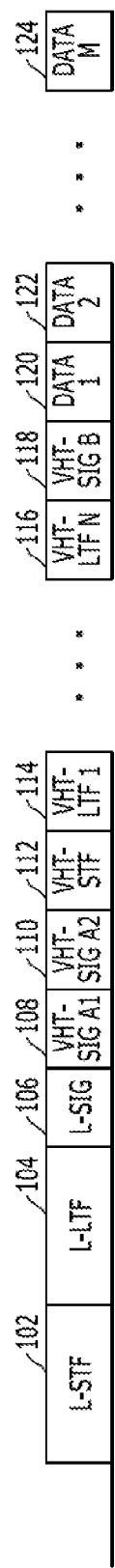
FIGS. 1 to 3 diagrams schematically showing the structures of a frame in a communication system in accordance with embodiments of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The present invention suggests an apparatus and a method for transmitting and receiving data in a communication system, for example, a wireless local area network (hereinafter, referred to as 'WLAN') system. While the WLAN system will be exemplarily described in embodiments of the present invention, the apparatus and the method for transmitting and receiving data suggested in the present invention may be applied to other communication systems.

Also, in an embodiment of the present invention, in a communication system, one access point (hereinafter, referred to as 'AP') normally transmits and receives data to and from a plurality of terminals, for example, stations, by controlling accesses of the terminals in a new frequency band which is not used by the legacy devices, to ensure a quality of service (QoS). Here, in the embodiment of the present invention, in order to support a service to a plurality of terminals in a WLAN system, an AP normally transmits and receives data to and from a plurality of terminals by controlling accesses of the terminals, in other words, access timing of the terminals, that is, access times at which the terminals transmit data to the AP, to ensure various QoS to the plurality of terminals in a new frequency band, thereby providing a service with various QoS to a plurality of users.

A communication system in accordance with an embodiment of the present invention, for example, a WLAN system, has been highlighted as a wireless communication technology for providing a high speed data service in an unlicensed band. In particular, unlike an existing cellular system, only if an AP serving as a base station is power-connected with a wired network, the communication system may be easily installed even by any one and data communication may be performed at a low cost. The decentralized operation characteristic of such a WLAN system provides an advantage in that a simple operation is possible, and is thus extended up to a sensor network and a smart utility network. Therefore, an embodiment of the present invention suggests a multiple access control scheme in which an AP of a WLAN system controls a plurality of terminals in correspondence to the above-described various service circumstances, thereby maximally ensuring QoS of the respective terminals and efficiently using channels. Through such multiple access control, signals are normally transmitted and received between the AP and the plurality of terminals, in particular, the plurality of terminals normally transmit signals to the AP.

Further, since the WLAN system provides advantages in that a network may be easily configured with a reduced cost and an unlicensed band is used, the application fields of the WLAN system are extended to cellular data off-loading and a smart utility or sensor network. Specifically, in the case of the smart utility network or a sensor network, each sensor terminal transmits its data to the AP with a predetermined period. Because terminals have QoS and characteristics in this way, it is efficient in terms of channel utilization for the AP to utilize the QoS and characteristics of the terminals and satisfy corresponding requirements of the respective terminals.

In this regard, an existing WLAN system has not sufficiently reflected the various service characteristics of the respective terminals. Although another communication system, for example, the IEEE 802.11e system, suggests division of an AC (access category) according to the kinds of the traffics of the respective terminals, utilization of periodic information of the traffics is impossible. Thus, in the communication system in accordance with the embodiment of the present invention, the AP controls the plurality of terminals, in particular, the accesses of the respective terminals, to satisfy various service characteristics of the respective terminals, such that data are normally transmitted and received between the AP and the terminals, in particular, the respective terminals normally transmit data to the AP.

Moreover, in the communication system in accordance with the embodiment of the present invention, in correspondence to the extension of utilization of the WLAN system to various application fields, the AP efficiently controls the plurality of terminals to satisfy various QoS such that data are normally transmitted and received. Here, in the case where the AP receives a specific service requirement from a random terminal, as the AP determines the access try time of the random terminal and a backoff policy, control is made such that data are normally transmitted and received by maximally reflecting the service characteristic of the random terminal, and the random terminal acquires effects, such as power saving, under the control of the AP.

Furthermore, in a communication system in accordance with an embodiment of the present invention, in order to control access times of a plurality of terminals, an AP controls accesses of a plurality of terminals by comparing the beacon interval of the beacon frames transmitted by an AP with the data transmission and reception periods of the terminals, and accordingly, data are normally transmitted and received between the AP and the terminals. Besides, in the communication system in accordance with the embodiment of the present invention, in the case where service characteristics such as data transmission and reception periodicity and data importance for the terminals of a WLAN system are determined, the AP controls the terminals by using such service characteristics of the terminals, in particular, controls the access timing of the terminals to the AP. Therefore, in the communication system in accordance with the embodiment of the present invention, by controlling the accesses of terminals through reflecting of a service characteristic of a specified terminal such as a sensor terminal while maintaining compatibility with existing terminals, the efficiency of the WLAN system may be improved.

Here, in an existing WLAN system, an AP does not include a function of concretely controlling the accesses of terminals. In order to ensure QoS, in another communication system, for example, the IEEE 802.11e system, data are classified into voice, video, best effort and background according to the characteristics of traffics, backoff, contention window, etc. are differently set, and a function of defining transmission opportunity (TXOP) and the like are added. Nevertheless, limitations exist in satisfying various QoS of terminals only in this way. In particular, since the respective terminals are not provided with priorities or the accesses of the terminals are not controlled, limitations exist in reflecting the characteristics of the respective terminals. Thus, in the communication system in accordance with the embodiment of the present invention, in the case where the service characteristics of the respective terminals are present, for example, data transmission and reception periodicity of a terminal such as a sensor terminal is clearly present, by allowing the terminal to periodically access the AP at specified times and affording a priority to the terminal for the access to the AP, channel utilization efficiency is improved. Here, in the communication system in accordance with the embodiment of the present invention, by configuring a beacon frame for communication in a new frequency band and by controlling the accesses of the terminals through using the beacon frame as a reference frame for control of the accesses of the plurality of terminals, data may be normally transmitted and received between the AP and the terminals.

In such a communication system in accordance with the embodiment of the present invention, wireless transmission in the new frequency band means wireless transmission in a frequency band which is different from the 2.4 GHz or 5 GHz band used in the existing WLAN system. Therefore, in the case where the frame structure of the IEEE 802.11ac system is used as it is in the embodiment of the present invention in which wireless transmission is implemented in the new frequency band, data processing rate is likely to deteriorate due to a substantial unnecessary overhead. For example, in the IEEE 802.11ac system, in order to maintain compatibility with the IEEE 802.11a system and the IEEE 802.11n system which are already defined in the same 5 GHz band, additional signals and information are included. However, in the case where the frame structure of the IEEE 802.11ac system is used in the new frequency band in accordance with the embodiment of the present invention, configuration of an efficient frame is possible because additional signals and information are not needed for such compatibility. Further, in the case where a new transmission scheme and a new data transmission rate are defined, bit allocation of control information may be changed.

In the frame structure of the above-described IEEE 802.11ac system, after a legacy short training field (L-STF), a legacy long training field (L-LTF) and a legacy signal field (L-SIG) are first defined in order for compatibility with the IEEE 802.11a system and the IEEE 802.11n system which use the same 5 GHz band, a very high throughput signal field (VHT-SIG) in which the control information of a frame actually used in the IEEE 802.11ac system is included, a very high throughput short training field (VHT-STF) for automatic gain control, a very high throughput long training field (VHT-LTF) for channel estimation, and a data field in which data to be actually transmitted are included, are defined.

The L-STF, L-LTF and L-SIG are fields which are defined for compatibility with the IEEE 802.11a system and the IEEE 802.11n system. Thus, in a system which does not use the 5 GHz band, the fields for the compatibility, that is, the L-STF, L-LTF and L-SIG, serve as unnecessary overheads. Hence, in the embodiment of the present invention, a novel frame structure, which reduces an overhead and includes new control information needed in a new system using a new frequency band, is configured.

The IEEE 802.11ac system enables data transmission of a G bps level while maintaining compatibility with the IEEE 802.11a system and the IEEE 802.11n system in the 5 GHz band. In particular, the IEEE 802.11ac system supports bandwidths of 20 MHz, 40 MHz, 80 MHz and 160 MHz, and transmits maximum 8 data streams using a multiple transmission and reception antenna technology, wherein data are transmitted by configuring a frame to maintain compatibility with other systems as described above. Hereinbelow, a frame structure in a communication system in accordance with an embodiment of the present invention will be described in detail with reference to FIGS. 1 to 3.

FIG. 1 is a diagram schematically showing a frame structure in a communication system in accordance with an embodiment of the present invention. FIG. 1 is a diagram schematically showing the frame structure of the IEEE 802.11ac system in the communication system in accordance with the embodiment of the present invention.

Referring to FIG. 1, a frame of the IEEE 802.11ac system includes control fields in which control information for data transmission to and from a plurality of terminals is included, that is, an L-STF 102, an L-LTF 104, an L-SIG 106, a VHT-SIG A1 108, a VHT-SIG A2 110, a VHT-STF 112, a plurality of VHT-LTFs, for example, a VHT-LTF 1 114 and a VHT-LTF N 116, and a VHT-SIG B 118, and includes a plurality of data fields as data fields in which data to be transmitted to the plurality of terminals are included, that is, a DATA 1 120, a DATA 2 122 and a DATA M 124.

The L-STF 102 is used in signal detection, automatic gain control, frequency error estimation, frame synchronization, and so forth, and the L-LTF 104 is used in channel estimation, frequency error estimation, and so forth. Also, the L-SIG 106 includes transmission rate information, frame length information, and so forth, and the VHT-SIG A1 108 and the VHT-SIG A2 110 include information such as band widths, guard interval lengths, space-time codes, transmission rates (MCS (modulation and coding scheme) levels), data stream numbers, AID information, a used coding technology, beamforming, and so forth.

The VHT-STF 112 is used in automatic gain control, and the VHT-LTF 1 114 and the VHT-LTF N 116 are used in channel estimation. The VHT-SIG B 118 includes transmission rates (MCS levels) by user, for multi-user MIMO (multi-input multi-output), data length information, and so forth, and the DATA 1 120, the DATA 2 122 and the DATA M 124 include data which are to be actually transmitted to users, that is, STAs (stations) as terminals.

The VHT-LTF 1 114 and the VHT-LTF N 116 are determined according to the number of data streams which are to be transmitted through the frame. For example, in the case where only one stream is transmitted, only the VHT-LTF 1 114, that is, one VHT-LTF is included in the frame, and, in the case where the number of streams is 2, the VHT-LTF 1 114 and a VHT-LTF 2, that is, two VHT-LTFs are included in the frame.

The transmission rate information and frame length information of the L-SIG 106 do not actually include the information of data, and causes data transmission not to be implemented during the length of a received frame in the case where the terminals of the IEEE 802.11a system or the IEEE 802.11n system receive the corresponding frame. The transmission rate information and frame length information of the L-SIG 106 become unnecessary information in the case where compatibility with the IEEE 802.11a system or the IEEE 802.11n system is not considered. The functions of the L-STF 102 and the L-LTF 104 may be replaced by the VHT-STF 112 and the VHT-LTFs 114 and 116. In the case where compatibility is not considered as described above, the frame structure of the IEEE 802.11ac system becomes an inefficient frame structure due to the presence of an overhead. A frame structure newly configured by removing such inefficiency will be described in detail with reference to FIG. 2.

Figure 2:
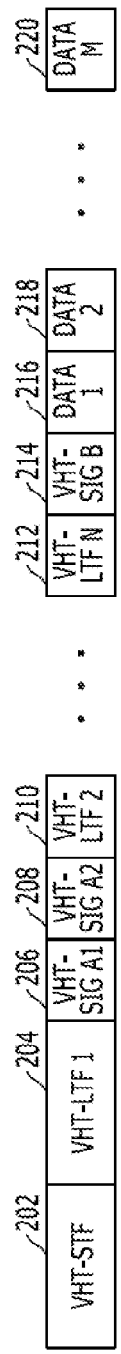

FIG. 2 is a diagram schematically showing a frame structure in a communication system in accordance with another embodiment of the present invention. FIG. 2 is a diagram showing a frame structure in which compatibility with the IEEE 802.11a system or the IEEE 802.11n system is not considered and an overhead is reduced from the frame structure of the IEEE 802.11ac system shown in FIG. 1, to improve efficiency. Also, FIG. 2 is a diagram showing a new frame structure in a new frequency band in a communication system in accordance with another embodiment of the present invention, which is different from a frequency band for transmitting and receiving data in an existing system.

Referring to FIG. 2, a frame in the new frequency band includes control fields in which control information for data transmission to and from a plurality of terminals is included, that is, a VHT-STF 202, a VHT-SIG A1 206, a VHT-SIG A2 208, a plurality of VHT-LTFs, for example, a VHT-LTF 1 204, a VHT-LTF 2 210 and a VHT-LTF N 212, and a VHT-SIG B 214, and includes a plurality of data fields as data fields in which data to be transmitted to the plurality of terminals are included, that is, a DATA 1 216, a DATA 2 218 and a DATA M 220.

The VHT-STF 202 is used in signal detection, automatic gain control, frequency error estimation, frame synchronization, and so forth, and the VHT-LTF 1 204 is used in channel estimation, frequency error estimation, and so forth. Also, the VHT-SIG A1 206 and the VHT-SIG A2 208 include information such as band widths, guard interval lengths, space-time codes, transmission rates (MCS levels), data stream numbers, AID information, a used coding technology, beamforming, application of a new transmission mode, and so forth.

Not only the VHT-LTF 1 204 but also the VHT-LTF 2 210 and the VHT-LTF N 212 are used in channel estimation, and the VHT-SIG B 214 includes transmission rates (MCS levels) by user, for multi-user MIMO, data length information, and so forth. The DATA 1 216, the DATA 2 218 and the DATA M 220 include data which are to be actually transmitted to users, that is, STAs as terminals.

In the communication system in accordance with the embodiment of the present invention, in order to transmit data using the frame in the new frequency band, the VHT-STF 202 is extended by the length of the L-STF 102 in the above-described frame of the IEEE 802.11ac system, and performs the function performed by the L-STF 102. Among the VHT-LTFs 204, 210 and 212, the VHT-LTF 1 204 as a first long training field is preferentially arranged at the front portion of the frame, that is, next to the VHT-STF 202, and the remaining N−1 number of VHT-LTFs 210 and 212 are arranged after the VHT-SIG A1 206 and the VHT-SIG A2 208. Control information for the frame which all terminals should receive is included in the VHT-SIG A1 206 and the VHT-SIG A2 208.

In the case where the communication system, which transmits and receives data using such frame in the new frequency band, supports a multi-user MIMO function, the VHT-SIG B 214, which includes the transmission rate information by user and the data length information, should be included in the frame structure in the new frequency band. In the case where the communication system does not support the multi-user MIMO function, the VHT-SIG B 214 may be omitted from the frame.

The structures of the VHT-SIG A1 206 and the VHT-SIG A2 208 are as given in Table 1.

TABLE 1

| VHT-SIG A1 | B0-B1 | Bandwidth | 2-bit | Denoting 20/40/80/160 MHz by 0/1/2/3, respectively. |
|---|---|---|---|---|
| | B3 | Reservation | 1-bit | Fixing to 1 |
| | B4-B9 | Group ID | 6-bit | Including group ID information |
| | B10-21 | Nsts | 12-bit | In the case of a multi-user, denoting the numbers of streams of 4 users to 0 to 4, by 3 bits for each user In the case of a single user, denoting 1(000) to 8(111) streams by B10 to B12, B13 to B21 including partial AID information |
| | B22 | TXOP_PS_NOT_ALLOWED | 1-bit | Indicating whether TXOP_PS can be utilized or not |

TABLE 1-continued

| | | | | |
|---|---|---|---|---|
| | B23 | Reservation | 1-bit | Fixing to 1 |
| VHT-SIG A2 | B0-B1 | Short GI | 2-bit | Setting according to whether short GI is used or not |
| | B2-B3 | Coding scheme (coding) | 2-bit | Indicating whether LDPC and BCC are used or not |
| | B4-B7 | Transmission rate (MCS) | 4-bit | Defining 10 MCSs from BPSK 1/2 code rate to 256-QAM 5/6 code rate |
| | B8 | Beamforming | 1-bit | Indicating whether beamforming is used or not |
| | B9 | Reservation | 1-bit | Fixing to 1 |
| | B10-B17 | CRC | 8-bit | Inserting CRC bit |
| | B18-B23 | Tail | 6-bit | For tailing trellis of Viterbi decoder |

In Table 1, in the case where the number of possible bandwidths (BWs) of the communication system in accordance with the embodiment of the present invention as shown in FIG. 2, which uses the frame structure in the new frequency band, is at least 4, the region B3 of the VHT-SIG A1 206 may be additionally utilized for bandwidth information in consideration of the cases where a bandwidth is equal to or larger than 20 MHz, 40 MHz, 80 MHz and 160 MHz, for example. In the case of Nsts which denotes the number of space-time transmission streams in the VHT-SIG A1 206, maximum 4 streams are allocated to 4 users for a multi-user, and, in the case of a single user, maximum 8 streams may be allocated. In the communication system in accordance with the embodiment of the present invention as shown in FIG. 2, which uses the frame structure in the new frequency band, as can be readily seen from above descriptions, each of the numbers of streams to be allocated is decreased to a half to secure a margin of 1 bit, and the 1 bit secured in this way may be allocated to a new transmission scheme.

That is to say, in the communication system in accordance with the embodiment of the present invention as shown in FIG. 2, which uses the frame structure in the new frequency band, a transmission rate is decreased to a half through repetitive transmission and the like when compared to a conventional system, and 1 bit may be allocated to define a mode capable of increasing a communication distance.

Therefore, in the communication system in accordance with the embodiment of the present invention, 3 bits are allocated to each user in the case of a multi-user, wherein 1 bit of the 3 bits is allocated as a bit for indicating whether or not to perform repetitive transmission, and the remaining 2 bits denote the number of transmission streams. Furthermore, in the communication system in accordance with the embodiment of the present invention, even in the case of a single user, 1 bit is used to indicate whether or not to perform repetitive transmission, the remaining 2 bits define 1 to 4 transmission streams, and, in the case where an additional transmission mode is further needed, the additional transmission mode may be used by using other reserved bits.

For example, in the communication system in accordance with the embodiment of the present invention, in the case where up to a 4× repetitive transmission mode or a 6× repetitive transmission mode is defined to further extend a communication distance, up to the region B23 of the VHT-SIG A1 206 or the region B9 of the VHT-SIG A2 208 is utilized in defining a new mode. Moreover, in the communication system in accordance with the embodiment of the present invention, in the case where a mode for extending a communication distance by increasing a reception sensitivity as in repetitive transmission is used, the VHT-STF 202 and the VHT-LTFs 204, 210 and 212 are used by being extended in the lengths thereof to improve performance of initial signal detection and channel estimation. The extended VHT-LTFs 204, 210 and 212 have the same structure as an existing OFDM (orthogonal frequency division multiplexing) symbol. In the case where the VHT-LTFs 204, 210 and 212 are not extended, they have the structure of DGI (double GI (guard interval))+LTF+LTF as in the L-LTF 104, and, in the case where the VHT-LTFs 204, 210 and 212 are extended, extension is made by increasing the number of the structures of GI+LTF which are added next to the structure of DGI+LTF+LTF.

For the sake of convenience in explanation, it is assumed that, in the basic structures of the VHT-SIG A1 206 and the VHT-SIG A2 208, 52 data subcarriers, which remain by excluding guard band, DC (direct current) and pilot subcarriers from total 64 subcarriers, are used as BPSK (binary phase shift keying) ½ coding rate channel codes. According to this fact, in the communication system in accordance with the embodiment of the present invention, while 26 bits may be allocated to each OFDM symbol, only 24 bits may be allocated to each OFDM symbol by using only 48 data subcarriers as in the L-SIG 106 of the IEEE 802.11ac system.

For example, in the communication system in accordance with the embodiment of the present invention, as in the IEEE 802.11ac system, a W Hz bandwidth mode using 64 subcarriers, a 2 W Hz bandwidth mode using 128 subcarriers, a 4 W Hz bandwidth mode using 256 subcarriers and an 8 W Hz bandwidth mode using 512 subcarriers are basically present, and a W/2 Hz bandwidth mode using 32 subcarriers is additionally present. In this regard, while W=20 MHz is defined in the IEEE 802.11ac system, in the communication system in accordance with the embodiment of the present invention, a bandwidth is used by being changed so as to use a new frequency band different from that of the IEEE 802.11ac system. The bandwidth in the new frequency band is defined as W Hz.

In other words, in the communication system in accordance with the embodiment of the present invention, the VHT-SIG A1 206 and the VHT-SIG A2 208 for the W/2 bandwidth mode and the VHT-SIG A1 206 and the VHT-SIG A2 208 for the W Hz, 2 W Hz, 4 W Hz and 16 W Hz bandwidth modes are separately defined. In the communication system in accordance with the embodiment of the present invention, since the W Hz, 2 W Hz, 4 W Hz and 16 W Hz bandwidth modes are defined by defining the W Hz bandwidth mode using 64 subcarriers and then extending the W Hz bandwidth mode, the total numbers of the bits included in the VHT-SIG A1 206 and the VHT-SIG A2 208 are the same with each other. Therefore, in the communication system in accordance with the embodiment of the present invention, in the case of allocating two OFDM symbols to the VHT-SIG A1 206 and the VHT-SIG A2 208, total 52 bits or 48 bits are used to allocate control information.

Figure 4:
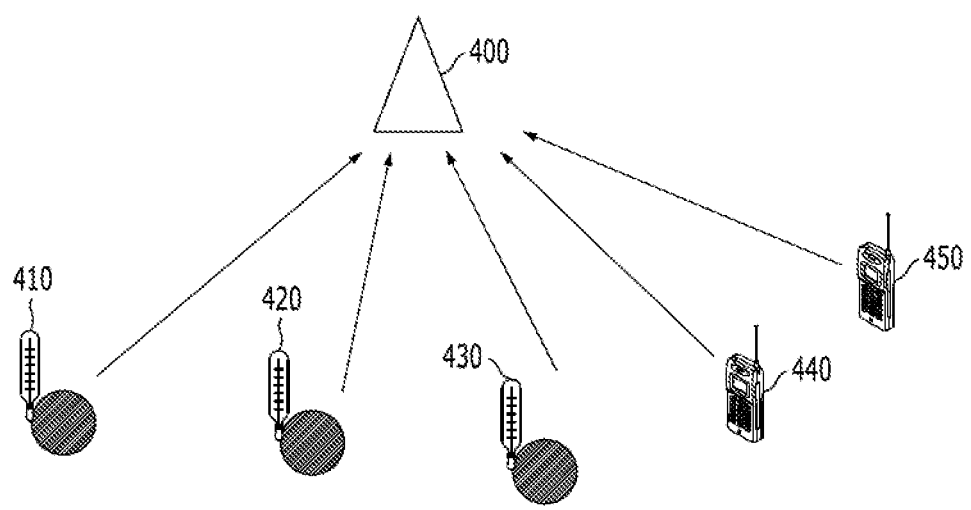
FIG. 4 is a diagram schematically showing the structure of a communication system in accordance with an embodiment of the present invention.

Also, in the communication system in accordance with the embodiment of the present invention, because subcarriers capable of being used in the W/2 Hz bandwidth mode are decreased to ½, the number of bits capable of being allocated to each OFDM symbol is limited. Namely, in the communication system in accordance with the embodiment of the present invention, as shown in FIG. 4, subcarriers are allocated according to the W Hz bandwidth mode using 64 subcarriers and the W/2 Hz bandwidth mode using 32 subcarriers. Since FIG. 4 will be described later in detail, concrete descriptions thereof will be omitted herein.

That is to say, in the communication system in accordance with the embodiment of the present invention, since a difference in the numbers of information bits capable of being allocated to the VHT-SIG A1 206 and the VHT-SIG A2 208 according to bandwidths is substantial, the OFDM symbol numbers and bit allocation schemes of the VHT-SIG A1 206 and the VHT-SIG A2 208 are made different according to bandwidths.

In detail, first, in the case of the W Hz bandwidth mode, in the communication system in accordance with the embodiment of the present invention, when assuming that two OFDM symbols are used as the VHT-SIG A1 206 and the VHT-SIG A2 208, bit allocation for the 48 bits or 52 bits of the VHT-SIG A1 206 and the VHT-SIG A2 208, that is, the information included in the VHT-SIG A1 206 and the VHT-SIG A2 208, is as follows.

MCS (modulation and coding scheme): 4 bits are needed (maximum 16 cases including 10 cases of the IEEE 802.11ac system and new MCSs, in which repetitive transmission is applied to a lowest transmission rate, are denoted).

Length (packet length): At least 10 bits are needed as the length is denoted by the unit of byte (denoted in a 2 byte or 4 byte type) or by the unit of OFDM symbol (an additional bit for solving the ambiguity of the last OFDM symbol is included). Here, 12 bits are needed in the case of the IEEE 802.11a system, 16 bits are needed in the case of the IEEE 802.11n system, and 17 bits are needed in the case of the IEEE 802.11ac system.

Guard interval (guard interval length): 2, 3 or 4 types are included in a regular GI type, a short GI type, and, as the occasion demands, a shorter GI type, and 1 bit or 2 bits are needed.

BW (bandwidth): 2 bits for denoting the W Hz, 2 W Hz, 4 W Hz and 8 W Hz bandwidth modes and 1 bit for denoting the W/2 Hz bandwidth mode are added. In the case of the W/2 Hz bandwidth mode, 1 bit may not be included in BW information for automatic detection using a preamble. 2 to 3 bits are needed.

STBC (space-time block code): 1 bit is needed to indicate whether STBCs are utilized or not.

Tail: 6 bits of 0 are inserted last.

Nsts (number of space-time streams): Maximum 4 as the number of data streams to be simultaneously transmitted using MIMO may be denoted, and 2 bits are needed.

Coding scheme: 1 bit is needed to select a convolution code and a low density parity check (LDPC) code.

TXOP-PS (power save using TXOP (transmission opportunity)): 1 bit is needed to denote selection according to whether TXOP-PS is utilized or not.

CRC: 8 bits are needed to perform CRC (cyclic redundancy check) for the VHT-SIG A1 206 and the VHT-SIG A2 208 (the number of bits may be changed through change of the coding rate of the CRC).

Reserved (reserved bit): Bits left after allocation are denoted by preset numbers at preset locations.

Further, in the communication system in accordance with the embodiment of the present invention, the contents used in the IEEE 802.11 system may be changed and other contents may be added. The following information is additionally included. That is to say, the information additionally included in the VHT-SIG A1 206 and the VHT-SIG A2 208 is as follows.

Application field and QoS (quality of service) requirements.

Aggregation.

Battery power warning.

Power level.

PSMP (power save multi-poll) group.

Warning signals.

A number of parameters associated with STA access.

In other words, in the communication system in accordance with the embodiment of the present invention, the VHT-SIG A1 206 and the VHT-SIG A2 208 constituted by 48 bits or 52 bits by combining bits as described above are transmitted during 2 OFDM symbols.

Moreover, in the W/2 Hz bandwidth mode, since total 24 bit allocation is possible in the case where only 2 OFDM symbols are allocated to the VHT-SIG A1 206 and the VHT-SIG A2 208, in the communication system in accordance with the embodiment of the present invention, only essential information is allocated as follows. That is to say, the essential information included in the VHT-SIG A1 206 and the VHT-SIG A2 208 is as follows.

MCS: 4 bits.

Length: 12 bits.

Tail: 6 bits.

Parity: 1 bit (error check is performed using parity, instead of CRC)

W/2 Hz BW (or GI): 1 bit. 1 bit may be allocated to identify the W/2 Hz bandwidth mode. Since automatic detection may be implemented using a preamble structure, a guard interval length is denoted instead.

In this way, in the communication system in accordance with the embodiment of the present invention, since only the essential information of 24 bits is allocated to the VHT-SIG A1 206 and the VHT-SIG A2 208, the number of OFDM symbols is increased to 3 or 4 in the case where information is additionally needed, so that the needed information is additionally allocated as in the W Hz bandwidth mode. Further, in the communication system in accordance with the embodiment of the present invention, in the case of the W/2 Hz bandwidth mode, the lengths of the VHT-SIG A1 206 and the VHT-SIG A2 208 may be made different from packet to packet, such that the amounts of the information included in the VHT-SIG A1 206 and the VHT-SIG A2 208 are made different from each other. In this regard, in order for a reception apparatus to verify the differences in the lengths of the VHT-SIG A1 206 and the VHT-SIG A2 208 and verify the extension of the VHT-LTFs 204, 210 and 212 in the case of using repetitive transmission, the VHT-SIG A1 206 and the VHT-SIG A2 208 are modified by combining Q-BPSK and BPSK and are then transmitted. According to this fact, the reception apparatus first discriminates the W/2

Hz bandwidth mode and the W Hz, 2 W Hz, 4 W Hz and 8 W Hz bandwidth modes from each other, verifies the VHT-SIG A1 206 and the VHT-SIG A2 208 in such a way as to correspond to such discrimination, detects the numbers of OFDM symbols used in the VHT-SIG A1 206 and the VHT-SIG A2 208 even in case of the W/2 Hz bandwidth mode, and extracts the information included in the VHT-SIG A1 206 and the VHT-SIG A2 208. Hereinbelow, a new frame structure in which a repetitive transmission scheme is considered in a communication system in accordance with an embodiment of the present invention will be described in detail with reference to FIG. 3.

Figure 3:
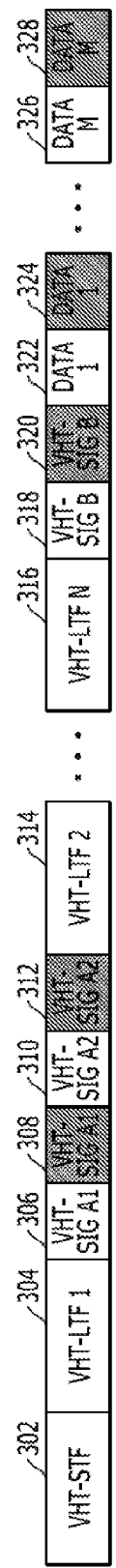

FIG. 3 is a diagram schematically showing a frame structure in a communication system in accordance with still another embodiment of the present invention. FIG. 3 is a diagram showing a new frame structure in which a repetitive transmission scheme is considered in the new frame structure for the new frequency band, shown in FIG. 2. Also, FIG. 3 is a diagram showing a new frame structure in which each of a VHT-SIG A1 and a VHT-SIG A2 includes 2 OFDM symbols and a 2× repetitive transmission scheme is exemplified.

Referring to FIG. 3, a frame in the new frequency band includes control fields in which control information for data transmission to and from a plurality of terminals is included, that is, a VHT-STF 302, two VHT-SIG A1s 306 and 308, two VHT-SIG A2s 310 and 312, a plurality of VHT-LTFs, that is, a VHT-LTF 1 304, a VHT-LTF 2 314 and a VHT-LTF N 316, and two VHT-SIG Bs 318 and 320 according to repetitive transmission, and includes a plurality of data fields as data fields in which data to be transmitted to the plurality of terminals are included, that is, two DATA 1s 322 and 324 and two DATA Ms 326 and 328.

The VHT-STF 302 is used in signal detection, automatic gain control, frequency error estimation, frame synchronization, and so forth, and the VHT-LTF 1 304 is used in channel estimation, frequency error estimation, and so forth. Also, the VHT-SIG A1s 306 and 308 and the VHT-SIG A2s 310 and 312 include information such as band widths, guard interval lengths, space-time codes, transmission rates (MCS levels), data stream numbers, AID information, a used coding technology, beamforming, and so forth.

Not only the VHT-LTF 1 304 but also the VHT-LTF 2 314 and the VHT-LTF N 316 are used in channel estimation, and the VHT-SIG Bs 318 and 320 include transmission rates (MCS levels) by user, for multi-user MIMO, data length information, and so forth. The DATA 1s 322 and 324 and the DATA Ms 326 and 328 include data which are to be actually transmitted to users, that is, STAs as terminals.

In the communication system in accordance with the embodiment of the present invention, in the case where a repetitive transmission scheme is considered, that is, a repetitive transmission mode is used, in the frame structure in the new frequency band shown in FIG. 2, not only a VHT-SIG A1 and a VHT-SIG A2 but also a VHT-SIG B repeat their respective previous symbols, that is, are consecutively repeated as in the frame structure shown in FIG. 3 and thus the two VHT-SIG A1s 306 and 308, the two VHT-SIG A2s 310 and 312 and the two VHT-SIG Bs 318 and 320 are included in the frame, and also, the data fields repeat their respective previous symbols, that is, are consecutively repeated and thus the two DATA 1s 322 and 324 and the two DATA Ms 326 and 328 are included in the frame. The consecutively repeated VHT-SIG A1s 306 and 308, VHT-SIG A2s 310 and 312, VHT-SIG Bs 318 and 320, DATA 1s 322 and 324 and DATA Ms 326 and 328 have the types of symbols which repeat their respective previous symbols, and are included in the frame through a variety of repetition schemes such as simple symbol repetition or repetition by changing the positions of subcarriers.

In the communication system in accordance with the embodiment of the present invention which uses the frame structure shown in FIG. 3, as reception sensitivity is improved, the length of the VHT-STF 302 is extended and thus signal detection performance in the reception apparatus is improved, and the lengths of the VHT-LTF2 314 and the VHT-LTF N 316 are extended as well. Namely, as aforementioned above with reference to FIG. 2, the VHT-STF 302 is extended by the length of the L-STF 102 in the above-described frame of the IEEE 802.11ac system, and performs the function performed by the L-STF 102. Among the VHT-LTFs 304, 314 and 316, the VHT-LTF 1 304 as a first long training field is preferentially arranged at the front portion of the frame, that is, next to the VHT-STF 302, and the remaining N−1 number of VHT-LTFs 314 and 316 are arranged after the VHT-SIG A1s 306 and 308 and the VHT-SIG A2s 310 and 312. Hereinbelow, the structure of a communication system in accordance with an embodiment of the present invention will be described in detail with reference to FIG. 4.

FIG. 4 is a diagram schematically showing the structure of a communication system in accordance with an embodiment of the present invention.

Referring to FIG. 4, in the case where a plurality of terminals 410, 420, 430, 440 and 450, for example, sensor terminals 410, 420 and 430 and general terminals 440 and 450, are to simultaneously access one AP 400 through an available frequency band, for example, a new frequency band different from a frequency band used for transmitting and receiving data in an existing system, a communication system controls accesses of the plurality of terminals 410, 420, 430, 440 and 450 to the AP 400, for example, access timing of the plurality of terminals 410, 420, 430, 440 and 450 to the AP 400, such that the plurality of terminals 410, 420, 430, 440 and 450 can simultaneously access the one AP 400 and can transmit and receive data through the available frequency band, for example, the new frequency band. Accordingly, the AP 400 and the plurality of terminals 410, 420, 430, 440 and 450 can normally transmit and receive data to and from each other.

Both the sensor terminals 410, 420 and 430 and the general terminals 440 and 450 may access the AP 400. The general terminals 440 and 450 are terminals which do not transmit terminal information including information such as data transmission and reception periodicity or data importance, that is, the service characteristic information of terminals, to the AP 400. The sensor terminals 410, 420 and 430 are terminals which transmit terminal information including information such as data transmission and reception periodicity or data importance, that is, the service characteristic information of terminals, to the AP 400. The service characteristic information of terminals included in the terminal information, that is, the information for data transmission and reception periodicity or data importance, is transmitted to the AP 400 by being included in request messages transmitted to the AP 400 upon initial association requests to the AP 400, for example, association request frames or data frames. In another instance, the AP 400 acquires the service characteristic information of the terminals 410, 420, 430, 440 and 450 by analogizing communication situations with the terminals 410, 420, 430, 440 and 450 which are to access the AP 400.

In other words, in the case where the sensor terminals 410, 420 and 430 and the general terminals 440 and 450 are to access the AP 400, as described above, the AP 400 receives the terminal information in which the service characteristic information of the terminals 410, 420, 430, 440 and 450 is included, from the terminals 410, 420, 430, 440 and 450. Through the terminal information received from the sensor terminals 410, 420 and 430 among the terminals 410, 420, 430, 440 and 450, the service characteristic information of the sensor terminals 410, 420 and 430 is verified, that is, the data transmission and reception periodicity or data importance of the sensor terminals 410, 420 and 430 is verified. Further, as described above, after the AP 400 verifies the service characteristics of the terminals 410, 420, 430, 440 and 450 through the received terminal information, the AP 400 controls the accesses of the terminals 410, 420, 430, 440 and 450 to the AP 400. In particular, the AP 400 determines the access timing of the sensor terminals 410, 420 and 430 to the AP 400 on the basis of the data transmission and reception periodicity or data importance of the sensor terminals 410, 420 and 430, and determines the access timing of the general terminals 440 and 450 to the AP 400 on the basis of the terminal information of the general terminals 440 and 450. In the communication system, the accesses of the general terminals 440 and 450 to the AP 400 may be implemented without control of the AP 400 in the same manner as in an existing WLAN system.

In detail, in the communication system, the plurality of terminals 410, 420, 430, 440 and 450, for example, the sensor terminals 410, 420 and 430 respectively transmit the terminal information in which their characteristics, for example, their service characteristic information, are included, to the AP 400. The AP 400 controls the accesses of the terminals 410, 420, 430, 440 and 450 to the AP 400 by using the terminal information respectively received from the terminals 410, 420, 430, 440 and 450, for example, determines the access timing of the terminals 410, 420, 430, 440 and 450, such that the terminals 410, 420, 430, 440 and 450 can access the AP 400 at the determined access timing and can normally transmit and receive data. As described above, the terminals 410, 420, 430, 440 and 450 transmit to the AP 400 the terminal information in which the information for their service characteristics, for example, the information for the data transmission and reception periodicity or data importance, is included, through including the terminal information in the request messages, for instance, the association request frames.

Namely, the terminals 410, 420, 430, 440 and 450 receive beacon frames for transmission and reception of data in the new frequency band, from the AP 400, and transmit the request messages as association request signals, for example, the association request frames, to the AP 400 to access the AP 400. The request messages, that is, the association request frames, include the terminal information, and the terminal information as information for the service characteristics of the terminals includes the information for the data transmission and reception periodicity or data importance of the terminals. The terminals may transmit information for access times at which the terminals are to access the AP 400, that is, starting time at which accesses are to be tried or data transmission is to be started, durations during which the accesses or the data transmission is to be tried, and ending time at which an access is to be tried or data transmission is to be ended, as terminal information, to the AP 400 through the association request frames.

The AP 400 having respectively received the association request frames from the terminals 410, 420, 430, 440 and 450 determines information for access times to the AP 400, that is, access timing of the terminals 410, 420, 430, 440 and 450 to the AP 400, in consideration of the access situations of other terminals, that is, the access situations of all the terminals 410, 420, 430, 440 and 450, to transmit terminal access information in which the information for the access try times of corresponding terminals is included, to the corresponding terminals.

As the access timing of the terminals 410, 420, 430, 440 and 450, the AP 400 determines offsets as starting time of access and data transmission, periods of the access and data transmission and durations of the access and data transmission, and ending time of access and data transmission, for the terminals 410, 420, 430, 440 and 450, that is, determines transmission offsets, transmission periods and transmission durations. The access timing of the terminals 410, 420, 430, 440 and 450 is transmitted to the terminals 410, 420, 430, 440 and 450 as the terminal access information. The access timing of the terminals 410, 420, 430, 440 and 450 is transmitted as the terminal access information by including one offset, one duration and one period, or, is transmitted as the terminal access information by including access timing and durations as sets, for example, a set 1 (an offset 1 and a duration 1), a set 2 (an offset 2 and a duration 2), a set 3 (an offset 3 and a duration 3), and so forth.

The AP 400 having determined the access timing of the terminals 410, 420, 430, 440 and 450 transmits the terminal access information in which the information for the access timing is included, to the terminals 410, 420, 430, 440 and 450, by including it in response messages, for example, association response frames, as response signals. That is to say, the AP 400 determines the respective access timing of the terminals 410, 420, 430, 440 and 450 to the AP 400, by using the terminal information respectively received through the association request frames from the terminals 410, 420, 430, 440 and 450, and transmits the terminal access information in which the information for the access timing determined in this way is included, to the terminals 410, 420, 430, 440 and 450 through the association response frames.

The terminal access information includes not only offsets, durations and periods as described above but also beacon frame indexes, backoff and contention window information and information for the number of retransmission try times. Further, since the periods are the same as the data transmission and reception periods included in the terminal information transmitted from the terminals, that is, the data transmission and reception periods requested to the AP 400 by the terminals, the periods may be omitted.

In the case where the data importance of the sensor terminals 410, 420 and 430 has a priority over the data importance of the general terminals 440 and 450 among the terminals 410, 420, 430, 440 and 450, that is, in the case where the sensor terminals 410, 420 and 430 have a priority over the general terminals 440 and 450 in transmission and reception of data, when the AP 400 determines the access timing of the terminals 410, 420, 430, 440 and 450, the AP 400 makes the backoff of the sensor terminals 410, 420 and 430 smaller than the other general terminals 440 and 450, decreases the contention window, and accordingly, increases the channel access probabilities of the sensor terminals 410, 420 and 430, such that the sensor terminals 410, 420 and 430 can more normally transmit and receive data to and from the AP 400. The AP 400 may designate the number of retransmission try times of the terminals 410, 420, 430, 440 and 450, in particular, the general terminals 440 and 450 to limit the accesses thereof. The terminal access information of such terminals 410, 420, 430, 440 and 450 is respectively transmitted to the terminals 410, 420, 430, 440 and 450 by being included in the association response frames as the response messages as described above.

The terminals 410, 420, 430, 440 and 450 having received the response messages including the terminal access information, that is, the association response frames, verify their respective terminal access information, access channels at the access timing corresponding to them on the basis of the terminal access information, transmit data to the AP 400, and receive ACK (acknowledgment) messages from the AP 400 according to the reception of the data. In other words, the terminals 410, 420, 430, 440 and 450 having respectively received the association response frames access the AP 400 at the access timing corresponding to them and normally transmit and receive data to and from the AP 400.

The service characteristics of the terminals 410, 420, 430, 440 and 450 may be changed. In the case where the service characteristics of the terminals 410, 420, 430, 440 and 450 are changed in this way, the terminals 410, 420, 430, 440 and 450 include terminal information for the changed service characteristics in data frames, and transmit the data frames to the AP 400. According to the reception of the data frames including the terminal information for the changed service characteristics, the AP 400 includes changed terminal access information in ACK frames in correspondence to the terminal information for the changed service characteristics, and transmits the ACK frames to the respective terminals 410, 420, 430, 440 and 450.

As a consequence, the terminals 410, 420, 430, 440 and 450 access the AP 400 at access timing corresponding to the changed terminal access information to form links, and normally transmit and receive data to and from the AP 400. The terminals 410, 420, 430, 440 and 450 precisely verify their access and data transmission and reception intervals with respect to the AP 400, that is, the access timing. By precisely verifying their access and data transmission and reception intervals with respect to the AP 400 in this way, power consumption thereof may be reduced. Namely, the terminals 410, 420, 430, 440 and 450 are converted from a sleep mode into an awake mode only at times when they should transmit and receive data and should receive beacon frames, through their access and data transmission and reception intervals, to transmit and receive data, and operate in the sleep mode in the other times to save the power consumption thereof. Hereinbelow, transmission and reception of data in a communication system in accordance with an embodiment of the present invention will be described in detail with reference to FIGS. 5 and 6.

Figure 5:
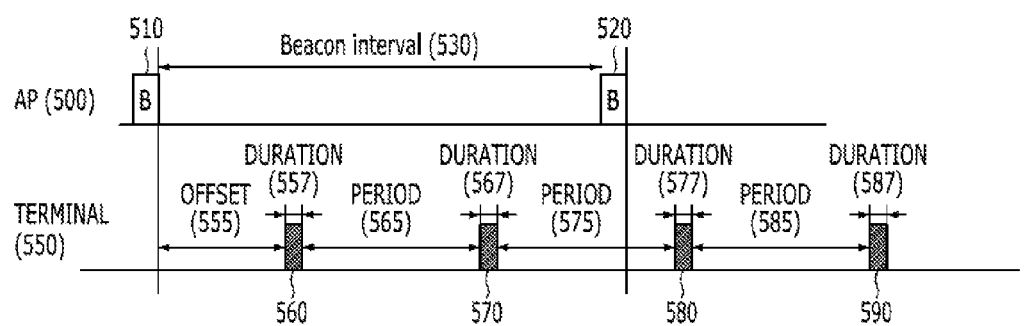
FIGS. 5 and 6 are diagrams schematically showing data transmission and reception procedures in the communication system in accordance with the embodiment of the present invention.
Figure 6:
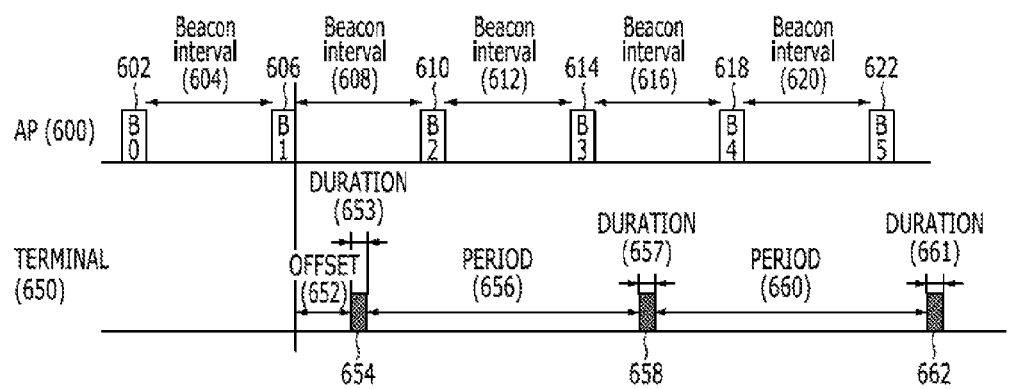

FIGS. 5 and 6 are diagrams schematically showing data transmission and reception procedures in the communication system in accordance with the embodiment of the present invention. FIG. 5 is a diagram schematically showing transmission and reception of data in the case where the access and data transmission/reception periods of the terminals with respect to the AP are included in the beacon interval of a beacon frame in the communication system, and FIG. 6 is a diagram schematically showing transmission and reception of data in the case where the access and data transmission/reception periods of the terminals with respect to the AP include the beacon interval of a beacon frame in the communication system.

First, referring to FIG. 5, in the communication system, after an AP 500 receives terminal information in which information for service characteristics such as data transmission and reception periodicity or data importance is included, from terminals, for example, a first terminal 550, the AP 500 controls the access of the first terminal 550 by using the received terminal information, that is, determines the access timing of the first terminal 550 to the AP 500, for instance, the access and data transmission and reception interval of the first terminal 550, and transmits terminal access information in which information for the access and data transmission and reception interval of the first terminal 550 is included, to the first terminal 550.

Terminal information is respectively transmitted from the terminals to the AP 500 through association request frames as request signals. The terminal information may include information for an access time at which the first terminal 550 is to access the AP 500, that is, information for starting time at which an access is to be tried or data transmission is to be started, a duration during which access or data transmission is to be performed, and ending time at which an access is to be tried or data transmission is to be ended.

The terminal access information is transmitted by the AP 500 to the terminals through association response frames as response signals. As aforementioned above, the terminal access information includes information for access timing of the first terminal 550 to the AP 500. As the access timing of the first terminal 550, an offset as starting time of access and data transmission, a period of the access and data transmission and a duration of the access and data transmission, and ending time of access and data transmission, for the first terminal 550, that is, a transmission offset, a transmission period and a transmission duration are included. The access timing of the first terminal 550 is transmitted as the terminal access information by including one offset and one duration, or, as access timing is variably determined, access timing and durations may be included as sets, for example, a set 1 (an offset 1 and a duration 1), a set 2 (an offset 2 and a duration 2), a set 3 (an offset 3 and a duration 3), and so forth. The terminal access information includes not only an offset, a duration and a period as described above but also a beacon frame index, backoff and contention window information and information for the number of retransmission try times.

As aforementioned above, the AP 500 controls the accesses of the terminals to the AP 500 by using the terminal information received from the plurality of terminals, that is, determines access and data transmission and reception intervals as the access timing of the terminals to the AP 500. As references for the control of access times of the plurality of terminals, and the access timing of the terminals according to the access control, that is the access and data transmission and reception intervals, beacon frames are used.

In other words, as the AP 500 transmits beacon frames 510 and 520 to the terminals, for example, the first terminal 550, with a predetermined period of a beacon interval 530, when a predetermined time, for example, an offset 555 elapses after the first terminal 550 receives the beacon frames 510 and 520, the first terminal 550 transmits data frames 560, 570, 580 and 590 to the AP 500 during durations 557, 567, 577 and 587 with predetermined periods 565, 575 and 585. By defining the periods 565, 575 and 585 as the beacon interval 530 or an optionally set period, the data frames 560, 570, 580 and 590 are transmitted to the AP 500. Each of the periods 565, 575 and 585 is included in the beacon interval 530, that is, is shorter than the beacon interval 530, and accordingly, information for a beacon frame index, which indicates the first beacon frame 510 as a reference beacon frame for the offset 555, as the index of a beacon frame, is not included in the terminal access information.

The offset 555 included in the terminal access information means standby time information, that is, a transmission starting time of the data frame, from after the first terminal 550 receives the first beacon frame 510 as the reference beacon frame between the beacon frames 510 and 520 received from the AP 500 to when the first terminal 550 transmits data, that is, the first data frame 560 as a first data frame, to the AP 500. The periods 565, 575 and 585 included in the terminal access information mean periods with which the first terminal 550 transmits the data frames 570, 580 and 590 to the AP 500, as the predetermined periods, after the first terminal 550 transmits the data frame 560 to the AP 500 after the offset 555, that is, after the first terminal 550 transmits the first data frame 560 as a first data frame to the AP 500. The durations 557, 577 and 587 included in the terminal access information mean time intervals during which the first terminal 550 accesses the AP 500 and transmits the data frames 560, 570, 580 and 590 to the AP 500.

Namely, the AP 500 includes the terminal access information in the association response frame on the basis of the beacon frames 510 and 520, in particular, the first beacon frame 510 as the reference beacon frame, and transmits the association request frame to the first terminal 550. By using the terminal access information, the first terminal 550 transmits the first data frame 560 as a first data frame to the AP 500 during the duration 557 when the offset 555 lapses from the beacon frames 510 and 520, in particular, the first beacon frame 510 as the reference beacon frame, that is, at the data frame transmission starting time, and transmits the data frames 570, 580 and 590 to the AP 500 during the durations 567, 577 and 587 with the predetermined periods 565, 575 and 585 after the offset 555. According to the characteristics of the communication system in accordance with the embodiment of the present invention, for example, the WLAN system, the offset 555 and the periods 565, 575 and 585 have predetermined margins, and in this state, transmission and reception of data is implemented between the first terminal 550 and the AP 500.

For example, in FIG. 5, in the case where the beacon interval 530 is 100 ms, the offset 555 is 30 ms and each of the periods 565, 575 and 585 is 40 ms, when the offset 555 of 30 ms as a data frame transmission start time lapses after the first beacon frame 510 is received, the first terminal 550 tries to access the AP 500 during the duration 557 and transmits the data frame 560. After transmitting the data frame 560 to the AP 500 after the lapse of the offset 555, the first terminal 550 transmits the data frames 570, 580 and 590 by trying to access the AP 500 during the durations 567, 577 and 587 every 40 ms as each of the periods 565, 575 and 585.

In the case where each of the periods 565, 575 and 585 is shorter than the beacon interval 530, that is, in the case where each of the periods 565, 575 and 585 is included in the beacon interval 530 of the beacon frames 510 and 520, the index of a beacon frame, that is, information for a beacon index which indicates the first beacon frame 510 as a reference beacon frame of the offset 555, is not included in the terminal access information. However, as shown in FIG. 6, in the case where each of the access and data transmission and reception periods with respect to the AP is longer than the interval of a beacon frame, that is, in the case where the beacon interval of a beacon frame is included in each of the access and data transmission and reception periods with respect to the AP, the index of a beacon frame which indicates a reference beacon frame is included in the terminal access information. Hereinbelow, transmission and reception of data in a communication system in accordance with another embodiment of the present invention will be described in detail with reference to FIG. 6.

Referring to FIG. 6, in the communication system, after an AP 600 receives terminal information in which information for service characteristics such as data transmission and reception periodicity or data importance is included, from terminals, for example, a first terminal 650, the AP 600 controls the access of the first terminal 650 by using the received terminal information, that is, determines the access timing of the first terminal 650 to the AP 600, for instance, an access period as a data transmission and reception interval of the first terminal 650, and transmits terminal access information in which information for the access period as the data transmission and reception interval of the first terminal 650 is included, to the first terminal 650.

Terminal information is respectively transmitted from the terminals to the AP 600 through association request frames as request signals. The terminal information may include information for an access time at which the first terminal 650 is to access the AP 600, that is, information for starting time at which an access is to be tried or data transmission is to be started, a duration during which access or data transmission is to be performed, ending time at which an access is to be tried or data transmission is to be ended.

The terminal access information is transmitted by the AP 600 to the terminals through association response frames as response signals. As aforementioned above, the terminal access information includes information for access timing of the first terminal 650 to the AP 600. As the access timing of the first terminal 650, an offset as starting time of access and data transmission, a period of the access and data transmission and a duration of the access and data transmission, and ending time of access and data transmission, for the first terminal 650, that is, a transmission offset, a transmission period and a transmission duration are included. The access timing of the first terminal 650 is transmitted as the terminal access information by including one offset and one duration, or, as access timing is variably determined, access timing and durations may be included as sets, for example, a set 1 (an offset 1 and a duration 1), a set 2 (an offset 2 and a duration 2), a set 3 (an offset 3 and a duration 3), and so forth. The terminal access information includes not only an offset, a duration and a period as described above but also a beacon frame index, backoff and contention window information and information for the number of retransmission try times.

As aforementioned above, the AP 600 controls the accesses of the terminals to the AP 600 by using the terminal information received from the plurality of terminals, that is, determines access and data transmission and reception intervals as the access timing of the terminals to the AP 600. As references for the control of access times of the plurality of terminals, and the access timing of the terminals according to the access control, that is the access and data transmission and reception intervals, beacon frames are used.

In other words, as the AP 600 transmits beacon frames 602, 606, 610, 614, 618 and 622 to the terminals, for example, the first terminal 650, with a predetermined period of beacon intervals 604, 608, 612, 616 and 620, when a predetermined time, for example, an offset 652 elapses after the first terminal 650 receives the beacon frames 602, 606, 610, 614, 618 and 622, the first terminal 650 transmits data frames 654, 658 and 662 to the AP 600 during durations 653, 657 and 661 with predetermined periods 656 and 660. By defining the periods 656 and 660 as the beacon intervals 604, 608, 612, 616 and 620 or an optionally set period, the data frames 654, 658 and 662 are transmitted to the AP 600. Each of the periods 656 and 660 includes each of the beacon intervals 604, 608, 612, 616 and 620, that is, is longer than each of the beacon intervals 604, 608, 612, 616 and 620, and accordingly, information for a beacon frame index, which indicates the second beacon frame 606 as a reference beacon frame for the offset 652, as the index of a beacon frame, is included in the terminal access information.

The offset 652 included in the terminal access information means standby time information, that is, a transmission starting time of the data frame, from after the first terminal 650 receives the second beacon frame 606 as the reference beacon frame among the beacon frames 602, 606, 610, 614, 618 and 622 received from the AP 600 to when the first terminal 650 transmits data, that is, the first data frame 652 as a first data frame, to the AP 600. The periods 656 and 660 included in the terminal access information mean periods with which the first terminal 650 transmits the data frames 658 and 662 to the AP 600, as the predetermined periods, after the first terminal 650 transmits the data frame 654 to the AP 600 after the offset 652, that is, after the first terminal 650 transmits the first data frame 654 as a first data frame to the AP 600. The durations 653, 657 and 661 included in the terminal access information mean time intervals during which the first terminal 650 accesses the AP 600 and transmits the data frames 654, 658 and 662 to the AP 600.

Namely, the AP 600 includes the terminal access information in the association response frame on the basis of the beacon frames 602, 606, 610, 614, 618 and 622, in particular, the second beacon frame 606 as the reference beacon frame, and transmits the association request frame to the first terminal 650. By using the terminal access information, the first terminal 650 transmits the first data frame 654 as a first data frame to the AP 600 during the duration 653 when the offset 652 lapses from the beacon frames 602, 606, 610, 614, 618 and 622, in particular, the second beacon frame 606 as the reference beacon frame, that is, at the data frame transmission starting time, and transmits the data frames 658 and 662 to the AP 600 during the durations 657 and 661 with the predetermined periods 656 and 660 after the offset 652. According to the characteristics of the communication system in accordance with the embodiment of the present invention, for example, the WLAN system, the offset 652 and the periods 656 and 660 have predetermined margins, and in this state, transmission and reception of data is implemented between the first terminal 650 and the AP 600.

For example, in FIG. 6, in the case where each of the beacon intervals 604, 608, 612, 616 and 620 is 100 ms, the offset 652 is 30 ms and each of the access periods 656 and 660 is 200 ms, by adopting not the first beacon frame 602 but the second beacon frame 606 as the reference beacon frame through the index of the beacon frame, when the offset 652 of 30 ms as a data frame transmission start time lapses after the second beacon frame 606 is received, the first terminal 650 tries to access the AP 600 during the duration 653 and transmits the data frame 654. After transmitting the data frame 654 to the AP 600 after the lapse of the offset 652, the first terminal 650 transmits the data frames 658 and 662 by trying to access the AP 600 during the durations 657 and 661 every 200 ms as each of the periods 656 and 660.

In the case where each of the periods 656 and 660 is longer than each of the beacon intervals 604, 608, 612, 616 and 620, that is, in the case where each of the periods 656 and 660 includes each of the beacon intervals 604, 608, 612, 616 and 620 of the beacon frames 602, 606, 610, 614, 618 and 622, the index of a beacon frame, that is, information for a beacon index which indicates the second beacon frame 606 as a reference beacon frame of the offset 652, is included in the terminal access information.

Here, as aforementioned above, in the case where an index for a specified beacon frame, for example, an index for a reference beacon frame of an offset is included in terminal access information, when transmitting information for an offset, a duration and a period, that is, the terminal access information, upper limit values exist in the offset and the period included in the terminal access information, so the beacon frame can be effectively configured. In particular, when transmitting and receiving data between an AP and a plurality of terminals, even in the case where a certain terminal has not received a beacon frame, the terminal can transmit and receive data to and from the AP with data transmission and reception periodicity. Hereinbelow, a data transmission apparatus, that is, an AP, which transmits and receives beacon frames and data to and from terminals, in a communication system in accordance with an embodiment of the present invention will be described in detail with reference to FIG. 7.

Figure 7:
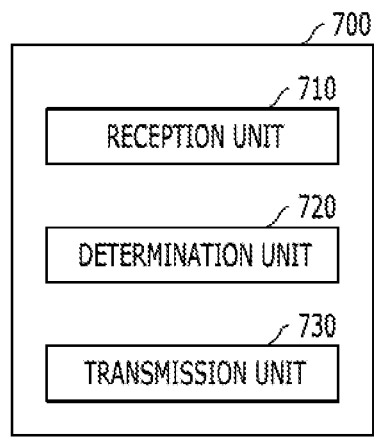
FIG. 7 is a diagram schematically showing the structure of a data transmission apparatus in a communication system in accordance with an embodiment of the present invention.

FIG. 7 is a diagram schematically showing the structure of a data transmission apparatus in a communication system in accordance with an embodiment of the present invention. FIG. 7 is a diagram schematically showing the structure of an AP which receives terminal information from a plurality of terminals and transmits and receives beacon frames and data to and from the terminals as described above.

Referring to FIG. 7, a data transmission apparatus 700, that is, an AP, includes a reception unit 710 configured to receive terminal information from a plurality of terminals which are to transmit and receive data through an available frequency band, for example, a new frequency band different from a frequency band used for transmitting and receiving data in an existing system, a determination unit 720 configured to verify the terminal information received from the plurality of terminals, determine access timing of the plurality of terminals and generate terminal access information of the terminals, and a transmission unit 730 configured to transmit association response frames including the terminal access information and beacon frames.

The reception unit 710 receives terminal information from a plurality of terminals which are to transmit and receive data through an available frequency band, for example, a new frequency band different from a frequency band used for transmitting and receiving data in the IEEE 802.11n system and the IEEE 802.11ac system as an existing WLAN system. The reception unit 710 receives the terminal information including service characteristic information from the terminals through request messages, for example, association request frames, and receives data frames from the terminals during the data transmission and reception intervals of the terminals, as described above.

The determination unit 720 verifies the terminal information received from the plurality of terminals, determines the access timing of the terminals to the AP by using the terminal information, and generates the terminal access information including information for the determined access timing.

The transmission unit 730 transmits the terminal access information to the terminals through the association response frames as response messages, transmits the beacon frames as references for access to the AP, to the terminals, and transmits ACK messages according to reception of data frames from the terminals during the data transmission and reception intervals of the terminals on the basis of the beacon frames.

Since the terminal information and the terminal access information, transmission and reception of the terminal information, transmission and reception of the terminal access information, and data transmission and reception between the AP and the terminals according to the terminal access information have been described above in detail, concrete descriptions thereof will be omitted herein. Hereinbelow, operations in which an AP having received terminal information from a plurality of terminals transmits beacon frames and data to the terminals in a communication system in accordance with an embodiment of the present invention will be described in detail with reference to FIG. 8.

Figure 8:
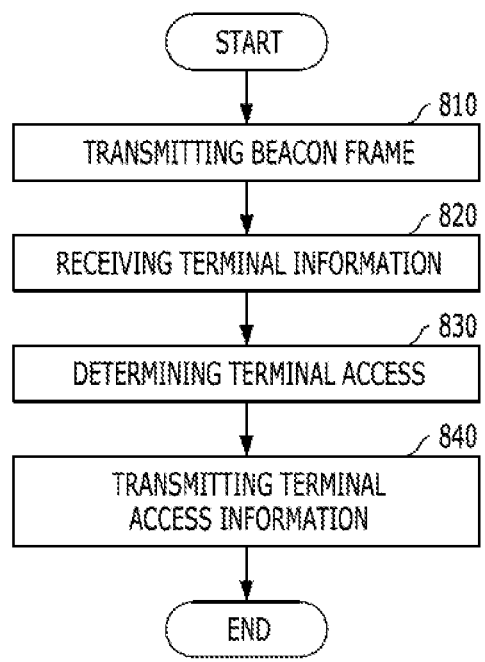
FIG. 8 is a diagram schematically showing a data transmitting procedure in the data transmission apparatus in a communication system in accordance with an embodiment of the present invention.

FIG. 8 is a diagram schematically showing a data transmitting procedure in the data transmission apparatus in a communication system in accordance with an embodiment of the present invention. FIG. 8 is a diagram schematically showing a procedure in which an AP having received terminal information from a plurality of terminals transmits and receives beacon frames and data to and from the terminals as described above.

Referring to FIG. 8, in step 810, a data transmission apparatus, that is, an AP, transmits beacon frames to terminals through an available frequency band, for example, a new frequency band different from a frequency band used for transmitting and receiving data in the IEEE 802.11n system and the IEEE 802.11ac system as an existing WLAN system. In step 820, the data transmission apparatus receives association request frames including terminal information from a plurality of terminals which are to transmit and receive data. Through the association request frames, that is, request messages, the terminal information including service characteristic information is received from the terminals.

In step 830, after verifying the terminal information received from the plurality of terminals, the data transmission apparatus determines access timing of the terminals to the AP by using the terminal information, and generates terminal access information including information for the determined access timing.

In step 840, the data transmission apparatus transmits the terminal access information to the terminals through association response frames as response messages, and receives data frames from the terminals during the access timing of the terminals based on the beacon frames, that is, during data transmission and reception intervals. Thus, the data transmission apparatus transmits and receives data to and from the terminals.

Since the terminal information and the terminal access information, transmission and reception of the terminal information, transmission and reception of the terminal access information, and data transmission and reception between the AP and the terminals according to the terminal access information have been described above in detail, concrete descriptions thereof will be omitted herein. Hereinbelow, a data reception apparatus, that is, a terminal, which receives beacon frames and data from an AP, in a communication system in accordance with an embodiment of the present invention will be described in detail with reference to FIG. 9.

Figure 9:
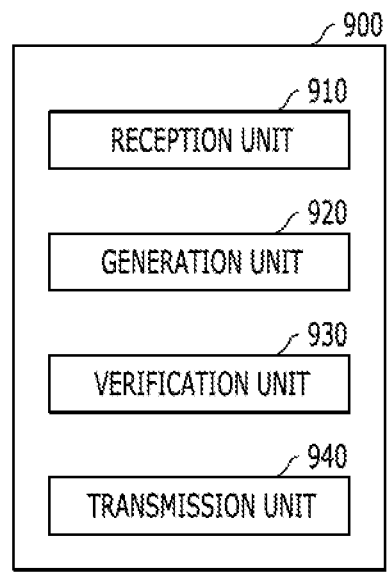
FIG. 9 is a diagram schematically showing the structure of a data reception apparatus in a communication system in accordance with an embodiment of the present invention.

FIG. 9 is a diagram schematically showing the structure of a data reception apparatus in a communication system in accordance with an embodiment of the present invention. FIG. 9 is a diagram schematically showing the structure of a terminal which receives beacon frames and data from an AP as described above.

Referring to FIG. 9, a data reception apparatus 900, that is, a terminal, includes a generation unit 920 configured to generate terminal information to transmit and receive data through an available frequency band, for example, a new frequency band different from a frequency band used for transmitting and receiving data in an existing system, a transmission unit 940 configured to transmit the terminal information to an AP, a reception unit 910 configured to receive terminal access information according to the terminal information from the AP, and a verification unit 930 configured to verify the terminal access information and verify access timing to the AP, that is, an access and data transmission and reception interval of the terminal with respect to the AP.

The generation unit 920 generates terminal information of the terminal itself in a new frequency band to transmit and receive data through an available frequency band, for example, a new frequency band different from a frequency band used for transmitting and receiving data in the IEEE 802.11n system and the IEEE 802.11ac system as an existing WLAN system.

The reception unit 910 receives the terminal access information according to the terminal information through a response message, for example, an association response frame, receives beacon frames from the AP through the new frequency band, and receives an ACK message according to transmission of data frames from the AP at access timing to the AP, that is, during an access and data transmission and reception interval with respect to the AP, according to the terminal access information.

The transmission unit 940 transmits the terminal information to the AP through a request message, for example, an association request frame, and transmits the data frames to the AP at the access timing to the AP, that is, during the access and data transmission and reception interval with respect to the AP, on the basis of the beacon frames, according to the terminal access information.

The verification unit 930 verifies the access timing to the AP, that is, the access and data transmission and reception interval with respect to the AP, on the basis of the beacon frames according to the terminal access information, through the terminal access information.

Since the terminal information and the terminal access information, transmission and reception of the terminal information, transmission and reception of the terminal access information, and data transmission and reception between the AP and the terminals according to the terminal access information have been described above in detail, concrete descriptions thereof will be omitted herein. Hereinbelow, operations in which a terminal receives beacon frames and data from an AP in a communication system in accordance with an embodiment of the present invention will be described in detail with reference to FIG. 10.

Figure 10:
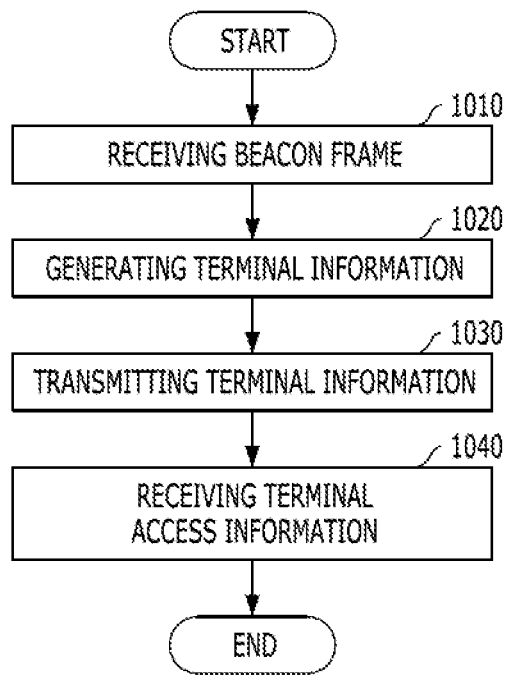
FIG. 10 is a diagram schematically showing a data receiving procedure in the data reception apparatus in a communication system in accordance with an embodiment of the present invention.

FIG. 10 is a diagram schematically showing a data receiving procedure in the data reception apparatus in a communication system in accordance with an embodiment of the present invention. FIG. 10 is a diagram schematically showing an operating procedure of a terminal which receives terminal access information and beacon frames from an AP.

Referring to FIG. 10, in step 1010, a data reception apparatus receives beacon frames through an available frequency band, for example, a new frequency band different from a frequency band used for transmitting and receiving data in the IEEE 802.11n system and the IEEE 802.11ac system as an existing WLAN system. In step 1020, the data reception apparatus generates terminal information of a terminal itself to transmit and receive data to and from an AP through the new frequency band.

In step 1030, the data reception apparatus transmits the terminal information to the AP through a request message, for example, an association request frame.

In step 1040, the data reception apparatus receives terminal access information according to the terminal information, through a response message, for example, an association response frame, and transmits data frames to the AP, that is, transmits and receives data to and from the AP, at the access timing to the AP, that is, during the access and data transmission and reception interval with respect to the AP, on the basis of the beacon frames, according to the terminal access information.

Since the terminal information and the terminal access information, transmission and reception of the terminal information, transmission and reception of the terminal access information, and data transmission and reception between the AP and the terminals according to the terminal access information have been described above in detail, concrete descriptions thereof will be omitted herein.

As is apparent from the above descriptions, in the communication system in accordance with the embodiments of the present invention, for example, in the case where the terminals of a WLAN system include service characteristics such as data transmission and reception periodicity and data importance, an AP controls the accesses of the terminals to the AP by using the service characteristics of the terminals, and determines and controls the access timing of the terminals on the basis of beacon frames. As a consequence, the service characteristic of a sensor terminal which includes a specific service characteristic may be reflected while maintaining compatibility with existing terminals, and accordingly, the efficiency of the WLAN system can be improved.

In the embodiments of the present invention, in the communication system, frames in the new frequency band are configured, and beacon frames including the access and data transmission and reception periods of a plurality of terminals with respect to the AP are transmitted and received according to the frames configured in this way. Therefore, the AP and the terminals transmit and receive data to and from each other by controlling the accesses of the terminals to the AP through the access and data transmission and reception periods. As a consequence, it is possible to transmit and receive data to and from the plurality of terminals in the new frequency band while ensuring QoS.

While the present invention has been described with respect to the specific embodiments, it will be apparent to those skilled in the art that various changes and modifications may be made without departing from the spirit and scope of the invention as defined in the following claims.

What is claimed is:

1. A data reception apparatus in a communication system, comprising:
   a generation unit configured to generate terminal information in a frequency band for transmission and reception of data between a terminal and an AP (access point), the terminal information including information on a period between transmissions;
   a transmission unit configured to transmit the terminal information to the AP;
   a reception unit configured to receive beacon frames from the AP through the frequency band, and receive terminal access information from the AP, the terminal access information corresponding to the terminal information; and
   a verification unit configured to verify access timing to the AP based on the beacon frames by using the terminal access information and the period between transmissions,
   wherein the transmission unit accesses the AP at the access timing and transmits first and second data frames to the AP,
   wherein the terminal access information includes information on an offset, the offset corresponding to a transmission starting time of the first data frame, as standby time information to until the terminal transmits the first data frame from a reference beacon frame among the beacon frames,
   wherein a transmission starting time of the second data frame occurs the period between transmissions after the transmission of the first data frame, and
   wherein the period between transmissions is a period of time different than a beacon interval between the beacon frames.

2. The data reception apparatus of claim 1, wherein the transmission unit determines a duration using the access timings, and
   wherein the transmission unit transmits the first data frame during the duration after lapse of the offset, from a reference beacon frame among the beacon frames, and, after transmitting the first data frame, periodically transmits additional data frames during the duration according to the period between transmissions.

3. The data reception apparatus of claim 1, wherein the terminal access information includes information on the period between transmissions.

4. The data reception apparatus of claim 3, wherein the terminal access information includes information on an index of a beacon frame representing the reference beacon frame among the beacon frames, in the case where the period between transmissions is longer than the beacon interval between the beacon frames.

5. The data reception apparatus of claim 3, wherein the terminal access information includes information on back-off, contention window and the number of retransmission try times.

6. The data reception apparatus of claim 1, wherein the terminal information includes service characteristic information of the terminals for data transmission and reception periodicity.

7. The data reception apparatus of claim 1, wherein the terminal information is received through association request frames, and the terminal access information is transmitted through association response frames.

8. A data receiving method of a terminal in a communication system, the method comprising:
   receiving beacon frames from an AP (access point) through a frequency band for transmission and reception of data between a plurality of terminals and the AP;
   generating terminal information in the frequency band;
   transmitting the terminal information to the AP, the terminal information including information on a period between transmissions;
   receiving terminal access information from the AP, the terminal access information corresponding to the terminal information;
   verifying access timing to the AP based on the beacon frames by using the terminal access information and the period between transmissions information;
   accessing the AP at the access timing and transmitting a first data frame to the AP; and
   transmitting a second data frame to the AP,
   wherein the terminal access information includes information on an offset, the offset corresponding to a transmission starting time of the first data frame, as standby time information to until the terminal transmits the first data frame from a reference beacon frame among the beacon frames, wherein a transmission starting time of the second data frame occurs the period between transmissions after the transmission of the first data frame, and wherein the period between transmissions is different than a beacon interval between the beacon frames.

9. The method of claim 8, further comprising:

determining a duration using the access timings;

transmitting the first data frame during the duration after lapse of an offset included in the terminal access information, from a reference beacon frame among the beacon frames; and after transmitting the first data frame, periodically transmitting additional data frames during the duration according to the period between transmissions.

10. The method of claim 8, wherein the terminal access information includes information on the period between transmissions.

11. The method of claim 10, wherein the terminal access information includes information on an index of a beacon frame representing a reference beacon frame among the beacon frames, in the case where the period between transmissions is longer than the beacon interval between the beacon frames.

12. The method of claim 10, wherein the terminal access information includes information on backoff, contention window and the number of retransmission try times.

13. The method of claim 8, wherein the terminal information includes service characteristic information of the terminals for data transmission and reception periodicity.

14. The method of claim 8, wherein the terminal information is received through association request frames, and the terminal access information is transmitted through association response frames.

* * * * *